(12) United States Patent
Sunaga

(10) Patent No.: US 6,571,085 B1
(45) Date of Patent: May 27, 2003

(54) PORTABLE TELEPHONE WHICH CAN CARRY OUT OPTICAL COMMUNICATION FOR SAVING POWER CONSUMPTION AND AVOIDING ERRONEOUS OPERATION WITHOUT COMPLEX OPERATION

(75) Inventor: Teruhide Sunaga, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,257

(22) Filed: Jan. 5, 2000

(30) Foreign Application Priority Data

Jan. 5, 1999 (JP) .......................................... 11-000581

(51) Int. Cl.⁷ .......................... H04B 1/40; H04M 1/00; C06F 3/00
(52) U.S. Cl. .............................. 455/88; 455/550; 710/1
(58) Field of Search .............................. 455/88, 50, 90, 455/550, 418–420, 556; 379/58, 56.1, 2, 3; 206/214

(56) References Cited

U.S. PATENT DOCUMENTS

| | | | |
|---|---|---|---|
| 5,025,919 A | * 6/1991 | Brinker et al. ............... | 206/214 |
| 5,615,259 A | 3/1997 | Gilbert ................... | 379/433.13 |
| 6,230,214 B1 | * 5/2001 | Liukkonen et al. ......... | 359/173 |

FOREIGN PATENT DOCUMENTS

| | | | |
|---|---|---|---|
| EP | 0607038 A1 | 7/1994 | |
| GB | 2308939 | * 12/1996 | |
| GB | 2304247 | 3/1997 | |
| GB | 2308939 | 7/1997 | |
| GB | 2323230 | * 12/1997 | |
| GB | 2323230 | 9/1998 | |
| GB | 2324674 | 10/1998 | |
| JP | 8-293830 | 11/1996 | |
| JP | 9-186574 | 7/1997 | |
| JP | 9-237145 | 9/1997 | |
| JP | 10-303824 | 11/1998 | |

* cited by examiner

*Primary Examiner*—Nguyen T. Vo
*Assistant Examiner*—David Nguyen
(74) *Attorney, Agent, or Firm*—Scully, Scott, Murphy & Presser

(57) ABSTRACT

A portable telephone apparatus includes a body, a window section, a cover section, an optical communication section, and a control section. The window section is provided in the body. The cover section is provided on the body to cover the window section. The cover section is opened and closed. The optical communication section is provided inside the body. The optical communication section performs an optical communication through the window section when the cover section is opened. The control section is provided in the body. The control section activates the optical communication section when the cover section is opened and deactivates the optical communication section when the cover section is closed.

3 Claims, 5 Drawing Sheets

PORTABLE TELEPHONE WHICH CAN CARRY OUT OPTICAL COMMUNICATION FOR SAVING POWER CONSUMPTION AND AVOIDING ERRONEOUS OPERATION WITHOUT COMPLEX OPERATION

BACKGROUND OF THE INVENTION

1. Field of the Invention

The present invention relates to a portable telephone having an optical communication function.

2. Description of the Related Art

Recently, a portable telephone having an infrared ray communication function has been provided.

For example, Japanese Laid Open Patent Application (JP-A-Heisei 8-293830) proposes an apparatus for transmitting a data provided by a non-voice communication service of a private telephone network from a portable telephone through an infrared ray communication to a display adapter to display it thereon.

Japanese Laid Open Patent Application (JP-A-Heisei 9-186574) proposes the following apparatus. That is, a control circuit compares an emitted infrared light with an infrared light of a reception light in which the emitted infrared light is reflected by a reflection plate, and then detects an information indicative of a fact that the received infrared light is cut off in accordance with the compared result. This cut off information is wirelessly transmitted from a wirelessly transmitting and receiving circuit to other terminal devices, or it is outputted from a handset device as a voice, displayed on a display, and stored in a memory circuit. Accordingly, this apparatus enables the moving states of a man and a body and the like to be detected. Thus, it is possible to improve a utilization efficiency of the terminal device.

Also, Japanese Laid Open Patent Application (JP-A-Heisei 9-237145) proposes an apparatus for transmitting and outputting a data of characters and voices within a portable telephone through an infrared ray communication to a television receiver.

Moreover, Japanese Laid Open Patent Application (JP-A-Heisei 10-303824) proposes an apparatus for transmitting a data between a portable telephone and an option device thereof through an infrared ray communication.

As mentioned above, the portable telephone having the infrared ray communication function to transmit and receive the various data to and from external apparatuses have been proposed. And, the portable telephone tends to be put into practical use.

By the way, if such infrared ray communication is applied to the portable telephone, when a power supply to an infrared ray sending and receiving device is always turned on, a battery is excessively exhausted to thereby, for example, shorten a continuously waiting time in the portable telephone.

If the infrared ray receiver is set at a constant actuation state, an erroneous recognition must be avoided when another infrared ray data is received.

If it is designed to set an infrared ray communication by using a function key, an addition of a new key operation is brought about in a portable telephone having further many functions, which results in a complex operation.

SUMMARY OF THE INVENTION

The present invention has been made to solve the above-described problems of the conventional portable telephone.

An object of the present invention is to provide a portable telephone which can control an actuation and a stop of a light transmitting and receiving device through an easy operation and effectively use an optical communication function.

In order to achieve an aspect of the present invention, a portable telephone apparatus, includes a body, a window section provided in the body, a cover section provided on the body to cover the window section, wherein the cover section is opened and closed, an optical communication section provided inside the body, wherein the optical communication section performs an optical communication through the window section when the cover section is opened and a control section provided in the body, wherein the control section activates the optical communication section when the cover section is opened and deactivates the optical communication section when the cover section is closed.

In this case, the portable telephone apparatus further includes a power supply section, and wherein the control section connects the optical communication section to the power supply section when the cover section is opened and disconnects the optical communication section from the power supply section when the cover section is closed.

Also in this case, the control section includes a first switching section and a second switching section, wherein the first switching section is switched in response to an operation of the window section and the second switching section detects a switching condition of the first switching section and switches, based on the detected switching condition, between a first condition that the optical communication section is connected to the power supply section and a second condition that the optical communication section is disconnected from the power supply section.

Further in this case, the cover section is tiltably provided on the body such that the cover section can be opened and closed.

Also in this case, the cover section is slidably engaged with the body such that the cover section can be opened and closed.

Further in this case, the cover section is removably provided on the body such that the cover section can be opened and closed.

In this case, the optical communication section performs an infrared ray communication.

Also in this case, the optical communication section outputs an optical signal.

Further in this case, the optical communication section inputs an optical signal.

Also in this case, the optical communication section outputs and inputs optical signals.

In this case, the portable telephone apparatus further includes an operating section to which an operation signal is supplied, and wherein the control section activates the optical communication section when the operation signal is supplied to the operating section and the cover section is opened.

Also in this case, the portable telephone apparatus further includes an operating section to which an operation signal is supplied, and wherein the control section deactivates the optical communication section when the operation signal is not supplied to the operating section and the cover section is closed.

Further in this case, the window section is provided to orient an upper direction of the body when the portable telephone apparatus is used.

In this case, the portable telephone apparatus further includes a display section provided in a first surface portion of the body, wherein the display section displays a number dialed, and wherein the window section is provided in a second surface portion of the body substantially orthogonal to the first surface portion, and wherein the second surface portion has two sides substantially opposite to each other, and the first surface portion is closer to a first side of the two sides than a second side thereof, and the cover section is tiltable to the body with respect to an axial line provided along the second side and disposed near to the second side.

Also in this case, the portable telephone apparatus further includes a display section provided in a first surface portion of the body, wherein the display section displays a number dialed, and wherein the window section is provided in a second surface portion of the body substantially orthogonal to the first surface portion, and wherein the second surface portion has two sides substantially opposite to each other, and the first surface portion is closer to a first side of the two sides than a second side thereof, and the cover section is slidable in such a direction that the cover section is spaced further from the second side.

In order to achieve another aspect of the present invention, an optical communication method of a portable telephone apparatus, includes (a) providing a portable telephone, wherein the portable telephone includes a body and an optical communication section provided inside the body, (b) covering the optical communication section, (c) deactivating the optical communication section when the optical communication section is covered, (d) opening the optical communication section, and (e) activating the optical communication section when the optical communication section is opened.

In this case, the (c) includes stopping a supply of a power to the optical communication section, and the (e) includes supplying the power to the optical communication section.

Also in this case, the (e) includes activating the optical communication section when the optical communication section is opened and a operation signal is supplied to the portable telephone apparatus by a user of the portable telephone apparatus.

In a portable telephone in the present invention, when an optical communication function is used, an open operation is performed on a cover to thereby open a window. Accordingly, an optical communication device is externally exposed to be set at a state at which the optical communication can be carried out. Also, this open operation to the cover enables the optical communication device to be automatically set at an actuation state by a switching circuit. Thus, various data can be transmitted through the optical communication to external apparatuses.

When the optical communication function is not used, a close operation is performed on the cover to thereby close the window. Accordingly, the optical communication device can be shielded from the external portion to thereby exclude the reception of an unnecessary optical signal. Also, this close operation to the cover enables the optical communication device to be automatically set at a stop state by the switching circuit. Thus, an electrical power consumption can be reduced.

BRIEF DESCRIPTION OF THE DRAWINGS

A more complete understanding of the teachings of the present invention may be acquired by referring to the accompanying figures, in which like reference numbers indicate like features and wherein.

DESCRIPTION OF THE PREFERRED EMBODIMENTS

Embodiments of a portable telephone according to the present invention will be described below with reference to the attached drawings.

Figure 1:
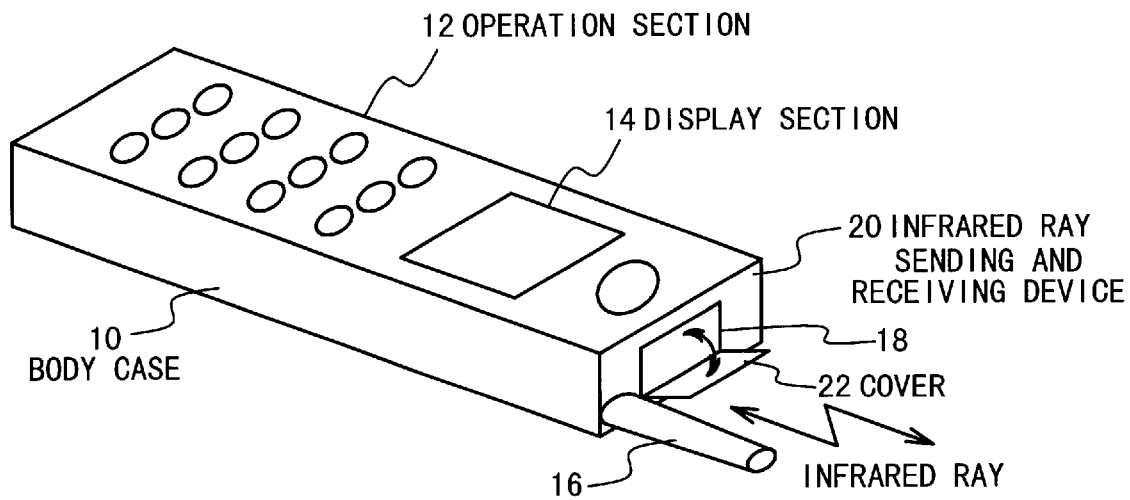
FIG. 1 is a perspective view showing an appearance of a portable telephone according to an embodiment in the present invention.
Figure 2:
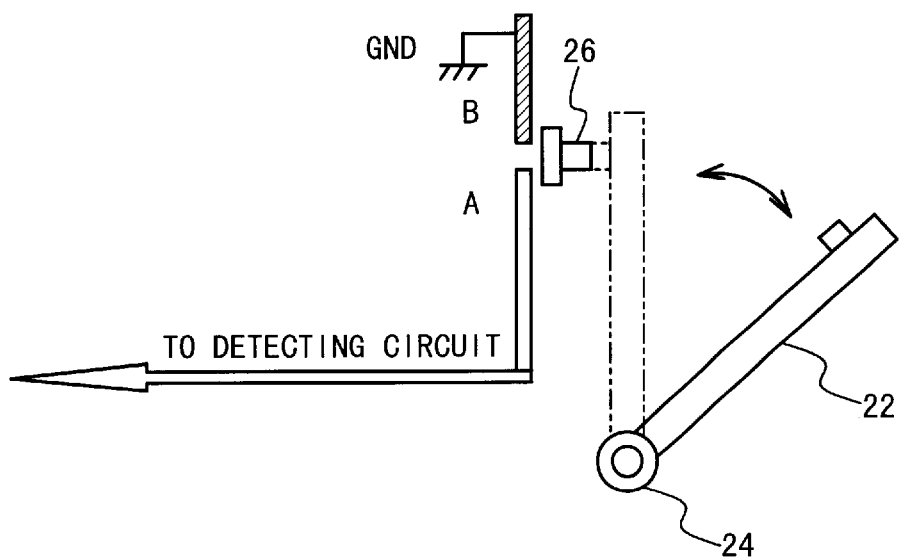
FIG. 2 is a portion section view showing a structure of an opening and closing section of a cover mounted in the portable telephone shown in FIG. 1.

FIG. 1 is a perspective view showing the appearance of the portable telephone according to this embodiment. FIG. 2 is a portion section view showing a structure of an opening and closing section of a cover mounted in the portable telephone shown in FIG. 1.

In FIG. 1, a body case 10 of the portable telephone is manufactured in a form of longitudinal parallelepiped at a size which can be held by a hand. An operation section 12 having dial keys and function keys, an LCD display section 14 for displaying an information such as a dial and the like are mounted on a surface of the body case 10.

On a top surface of the body case 10, an antenna 16 is mounted near a corner thereof, and a window 18 is mounted at a center thereof. A sending and receiving device 20 for carrying out an infrared ray communication is mounted in this window 18. Thus, infrared rays can be sent and received between the sending and receiving device 20 and an external apparatus (not shown).

Also, a cover 22 is mounted in the window 18 to cover the window 18. The cover 22 is opened and closed. The cover 22 is supported such that a base side of the cover 22 can be rotated by a hinge 24. The cover 22 is tiltable. So, the window 18 is opened and closed by a tiltable operation of a user. Then, a switch (a first switch) 26 is mounted in the body case 10, oppositely to a tip side of the cover 22.

This switch 26 has, for example, a normally open contact. The switch 26 is pushed by the tip of the cover 22 in a state that the window 18 is closed by the cover 22 to thereby short the connection between contacts A and B. If the cover 22 is opened, the pressure pushed by the cover 22 is released to thereby open the connection between the contacts A and B.

The contact A is connected to a detecting circuit as described later, and the contact B is connected to a ground GND. Then, the detecting circuit always monitors the open state or the shorted state between the contacts A and B, for example, due to an interruption operation of a certain period.

Figure 3:
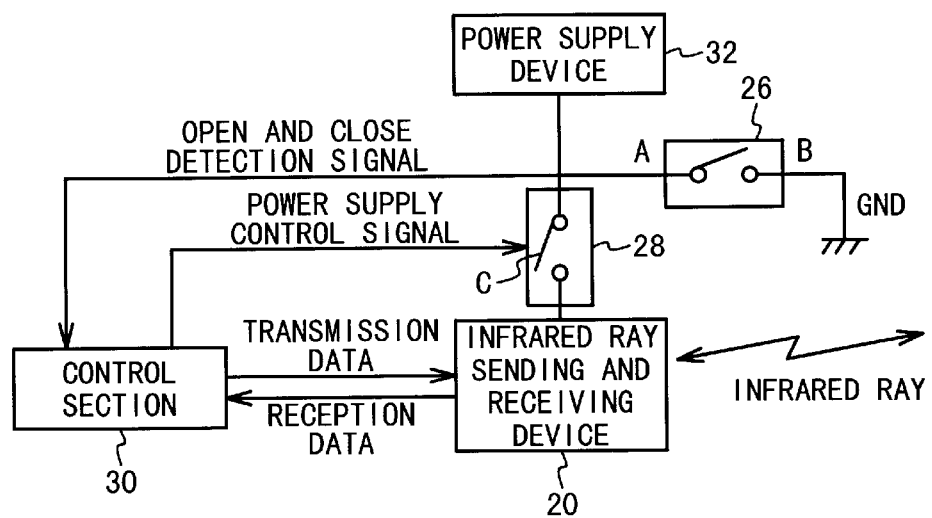
FIG. 3 is a block diagram showing a configuration of a control system of the portable telephone shown in FIG. 1.

FIG. 3 is a block diagram showing a configuration of a control system of the portable telephone shown in FIG. 1.

In FIG. 3, a control section 30 controls the whole portable telephone in this embodiment. The control section 30 contains the detecting circuit, and then controls the infrared ray sending and receiving device 20 in accordance with the state of the switch 26, and further controls the infrared ray communication function as a whole.

Also, a switch (a second switch) 28 opens and closes the connection between the infrared ray sending and receiving device 20 and a power supply device 32, in accordance with the control of the control section 30.

The power supply device 32 sends a power supply of the whole portable telephone, and then sends a power supply through the switch 28 to the infrared ray sending and receiving device 20.

The infrared ray sending and receiving device 20 is actuated by the supply of the power supply through the switch 28 from the power supply device 32, and set at a state that the infrared rays can be sent and received. Also, it is set at a stop state when the power supply from the power supply device 32 is turned off.

The control section 30 monitors the state of the switch 26. Then, if the close operation is performed on the cover 22 to thereby turn on the switch 26 and further short the connection between the contacts A and B, this shorted condition is detected by an open and close detection signal (Low Signal) from the switch 26. Accordingly, the control section 30 judges that the cover 22 is at the close state. In this time, a contact C of the switch 28 is opened in accordance with a power supply control signal (Low Signal) outputted from the control section 30. And, the connection between the power supply device 32 and the infrared ray sending and receiving device 20 is cut off to thereby set the infrared ray sending and receiving device 20 at the stop state.

Also, if the open operation is performed on the cover 22 to thereby turn off the switch 26 and further open the connection between the contacts A and B, the control section 30 detects this opened condition by the open and close detection signal (High Signal) from the switch 26. Accordingly, the control section 30 judges that the cover 22 is at the open state. In this time, the contact C of the switch 28 is closed in accordance with the power supply control signal (High Signal) to thereby connect the power supply device 32 and the infrared ray sending and receiving device 20 to each other.

Accordingly, the infrared ray sending and receiving device 20 is actuated to make the infrared ray communication possible.

So, when the infrared rays are sent, the control section 30 transmits a transmission data to the infrared ray sending and receiving device 20. The infrared ray sending and receiving device 20 outputs the infrared rays corresponding to the transmission data from the infrared ray transmitter of the infrared ray sending and receiving device 20, and transmits to an infrared ray receiver of an outer apparatus.

Also, when the infrared rays are received, the infrared rays received by the infrared ray receiver of the infrared ray sending and receiving device 20 are converted into a reception data to be transmitted to the control section 30.

In this way, only when the cover 22 is at the open state, the infrared ray sending and receiving device 20 can be actuated to thereby carry out the infrared ray communication.

On the other hand, if the cover 22 is at the close state, the supply of a power to the infrared ray sending and receiving device 20 is stopped, which can reduce the power consumption. Also, the double functions of closing the cover 22 and stopping the infrared ray sending and receiving device 20 can effectively protect the incorrect infrared signal caused by an erroneous operation and the like from being sent or received.

As mentioned above, the portable telephone in this embodiment does not require the complex operations, such as the function setting and the like, before the situation that the infrared ray communication can be carried out. Thus, the operation can be simplified.

Also, the power is supplied to the infrared ray sending and receiving device 20 only when the infrared ray communication is carried out. Hence, a power consumption can be reduced to avoid the reduction of a waiting time of the portable telephone.

Also, the cover 22 is opened only when the infrared ray communication is carried out. Thus, an erroneous operation caused by being input to other infrared rays into the infrared ray sending and receiving device 20, can be protected.

Figure 4:
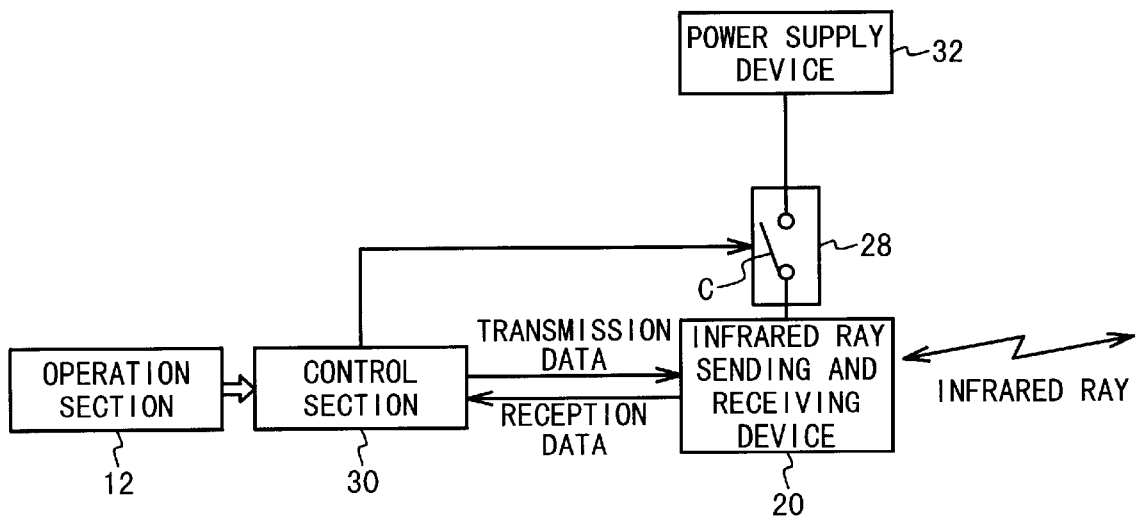
FIG. 4 is a block diagram showing a configuration of a control system according to a variation of the portable telephone shown in FIG. 1.

FIG. 4 is a block diagram showing a variation of the portable telephone in this embodiment. The same symbols are given to components common to those of the configuration shown in FIG. 3.

In the portable telephones shown in FIGS. 1 to 3, the open and close operation of the cover 22 is used to switch between the actuation and the stop of the infrared ray sending and receiving device 20. In the example shown in FIG. 4, in accordance with a key operation signal from the operation section 12, the control section 30 controls the contact C of the switch 28 to thereby open and close the connection between the infrared ray sending and receiving device 20 and the power supply device 32.

Also in the portable telephones shown in FIGS. 1 to 3, the open and close operation of the cover 22 is used to switch the infrared ray sending and receiving device 20 between the actuation and the stop. In the example shown in FIG. 4, both the key operation from the operation section 12 and the open and close operation of the cover 22 may be used to switch the infrared ray sending and receiving device 20 between the actuation and the stop.

Figure 5:
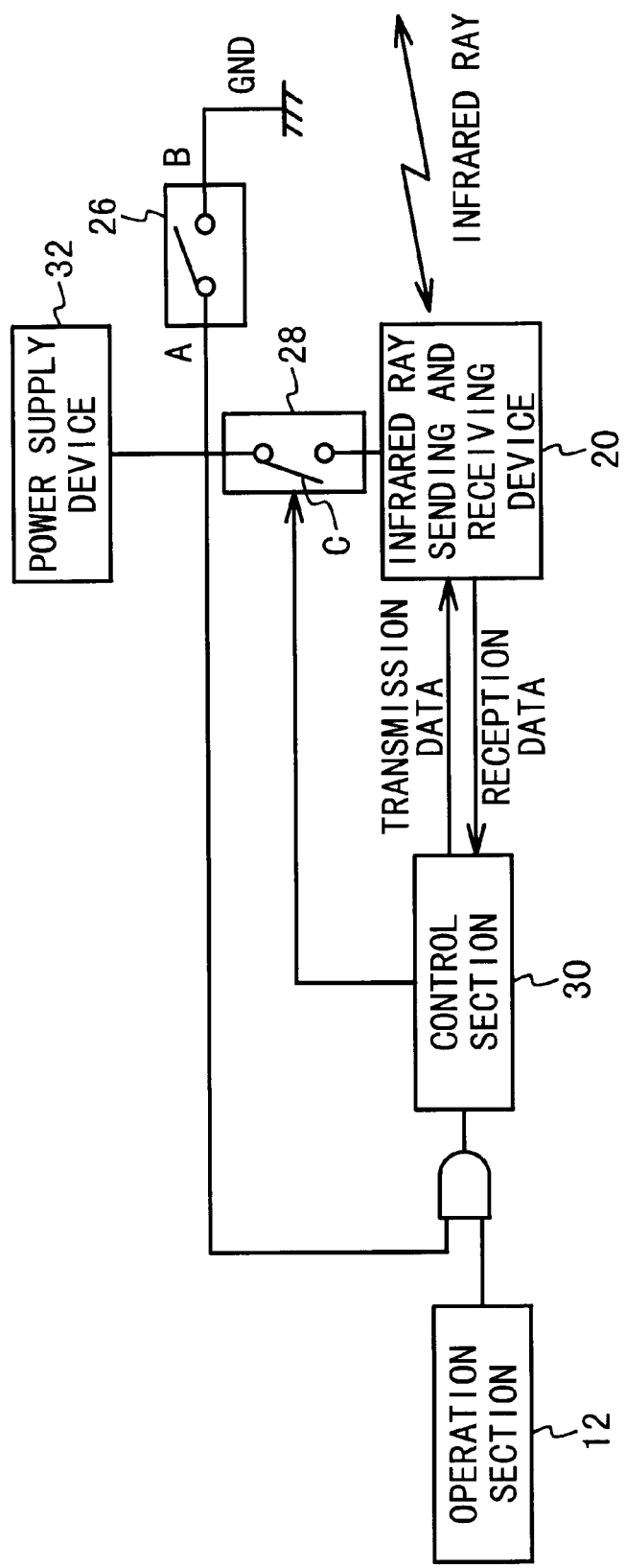
FIG. 5 is a block diagram showing a configuration of a control system according to another variation of the portable telephone shown in FIG. 1

For example, as shown in FIG. 5, the control section 30 determines whether or not actuate the infrared ray sending and receiving device 20 based on the logical OR (logical inclusion) or AND (logical conjunction) of the key operation from the operation section 12 and the open and close operation of the cover 22. In this case, the control section 30 may determine whether or not deactivate the infrared ray sending and receiving device 20 based on the logical OR (logical inclusion) or AND (logical conjunction) of the key operation from the operation section 12 and the open and close operation of the cover 22.

In the above-mentioned description, the infrared ray communication is exemplified as the optical communication function in the portable telephone. The portable telephone can have similarly an optical communication function other than the infrared ray communication function.

Figure 6:
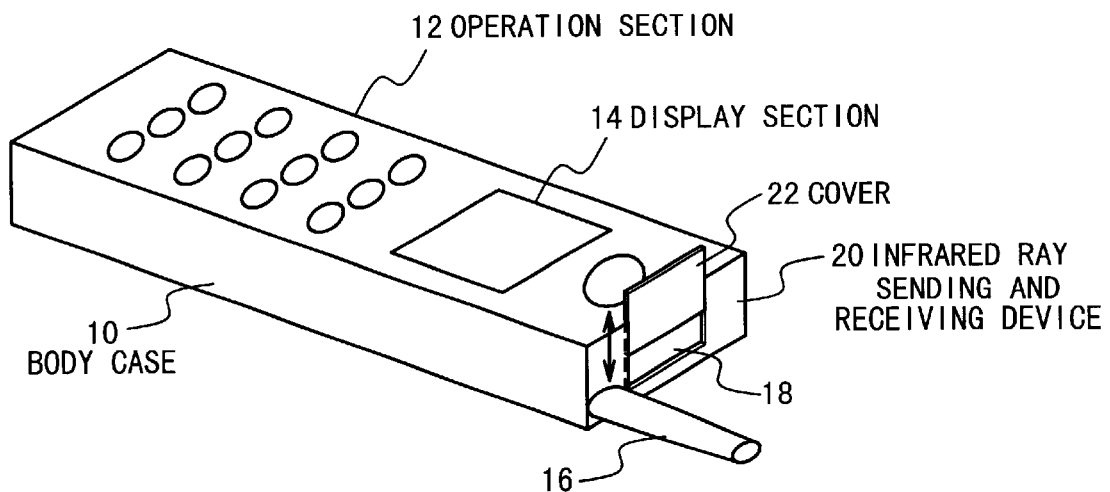
FIG. 6 is a perspective view showing an apparatus of a portable telephone according to a variation of the embodiment in the present invention.
Figure 7:
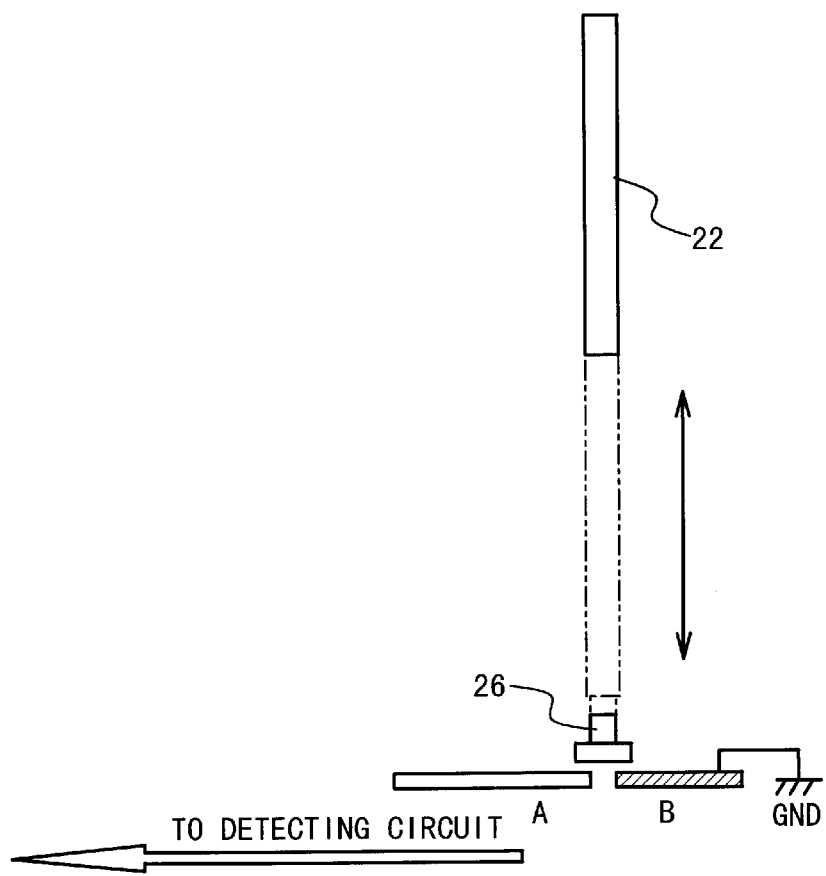
FIG. 7 is a portion section view showing a structure of an opening and closing section of a cover mounted in the portable telephone shown in FIG. 6.

Also, the example in which the window 18 is opened and closed by the rotational operation through the hinge 24 is described as the structure of the cover 22. As shown in FIG. 6, the structure of the cover 22 may be designed so as to open and close the window 18 through a sliding operation. In this case, as shown in FIG. 7, a switch 26 operated in response to a slid position of the cover 22 is mounted so as to actuate and stop the infrared ray sending and receiving device 20. In FIG. 6, the cover 22 can be removable from the body case 10.

The configuration in which both the transmission and the reception of the infrared rays are carried out is described in the above-mentioned examples. Only one function of the transmission and the reception may be installed in the portable telephone.

Figure 8:
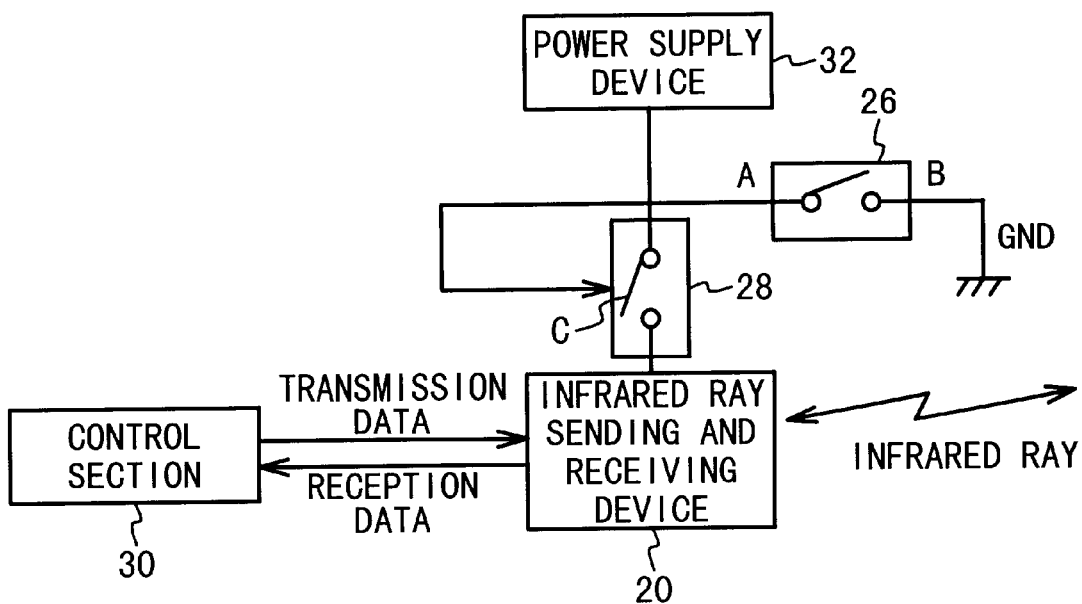
FIG. 8 is a block diagram showing a configuration of a control system according to still another variation of the portable telephone shown in FIG. 1.

Also in the above-mentioned examples, the operation of the switch 26 is judged by the control section 30. Accordingly, the control section 30 control the actuation and the stop of the infrared ray sending and receiving device 20, based on the judgement result. As shown in FIG. 8, the switch 28 may be operated in response to the operation of the switch 26 without such intervention of the control section 30.

As mentioned above, in the portable telephone of the present invention, the window having the optical communication device for carrying out the optical communication between it and the external apparatus is mounted in the body case of the portable telephone. Accordingly, the optical communication device is switched between the actuation and the stop, in accordance with the open and close operation of the cover for opening and closing this window.

For this reason, the optical communication device can be moderately switched between the actuation and the stop such that the actuation corresponds to the use and the stop corresponds to the non-use. Thus, this can save the power consumption and avoid the erroneous operation and also provide the effect of effectively using the optical communication function of the portable telephone without the complex operation.

What is claimed is:

1. A portable telephone apparatus, comprising:

a body;

a window section provided in said body;

a cover section provided on said body to cover said window section, wherein said cover section is opened and closed;

an optical communication section provided inside said body, said optical communication section performing an optical communication through said window section when said cover section is opened;

a control section provided in said body, said control section activating said optical communication section when said cover section is opened and deactivating said optical communication section when said cover section is closed;

a power supply section, said control section connecting said optical communication section to said power supply section when said cover section is opened and disconnecting said optical communication section from said power supply section when said cover section is closed;

said control section including a first switching section and a second switching section, said first switching section being switched in response to an operation of said window section and said second switching section detecting a switching condition of said first switching section and switches, based on said detected switching condition, between a first condition that said optical communication section is connected to said power supply section and a second condition that said optical communication section is disconnected from said power supply section.

2. A portable telephone apparatus, comprising:

a body;

a window section provided in said body;

a cover section provided on said body to cover said window section, said cover section being opened and closed;

an optical communication section provided inside said body, said optical communication section performing an optical communication through said window section when said cover section is opened;

a control section provided in said body, said control section activating said optical communication section when said cover section is opened and deactivating said optical communication section when said cover section is closed;

said cover section being tiltably provided on said body such that said cover section can be opened and closed; and a display section provided in a first surface portion of said body, said display section displaying a number dialed, said window section being provided in a second surface portion of said body substantially orthogonal to said first surface portion, said second surface portion having two sides substantially opposite to each other, said first surface portion being closer to a first side of said two sides than a second side thereof, and said cover section being tiltable to said body with respect to an axial line provided along said second side and disposed near to said second side.

3. A portable telephone apparatus, comprising:

a body;

a window section provided in said body;

a cover section provided on said body to cover said window section, said cover section being opened and closed;

an optical communication section provided inside said body, said optical communication section performing an optical communication through said window section when said cover section is opened;

a control section provided in said body, said control section activating said optical communication section when said cover section is opened and deactivating said optical communication section when said cover section is closed;

said cover section being slidably engaged with said body such that said cover section can be opened and closed; and a display section provided in a first surface portion of said body, said display section displaying a number dialed, said window section being provided in a second surface portion of said body substantially orthogonal to said first surface portion, said second surface portion having two sides substantially opposite to each other, said first surface portion being closer to a first side of said two sides than a second side thereof, and said cover section being slidable in such a direction that said cover section is spaced further from said second side.

* * * * *